Figure 1:
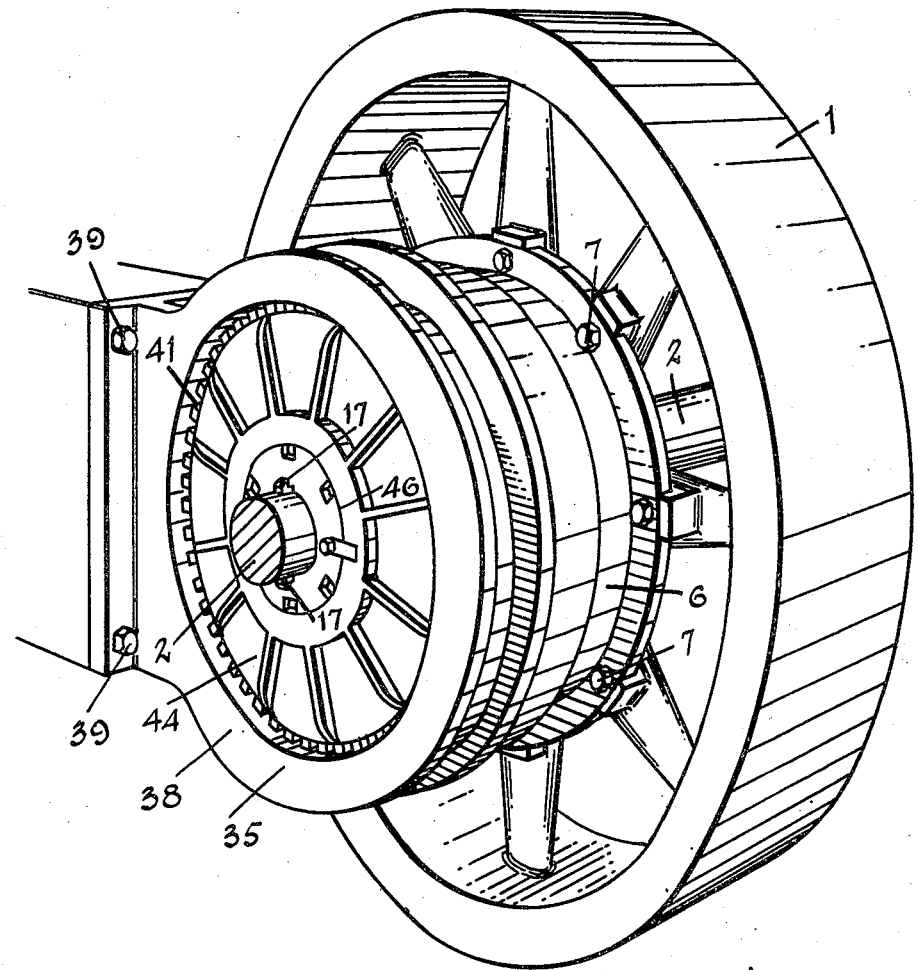

July 23, 1935.  F. J. RODE ET AL  2,009,301

CLUTCH AND BRAKE CONTROL DEVICE

Filed Dec. 20, 1933  3 Sheets-Sheet 2

Inventors.
Fredrich J. Rode
and Meredith R. Hatch
By Faust F. Crampton
Attorney

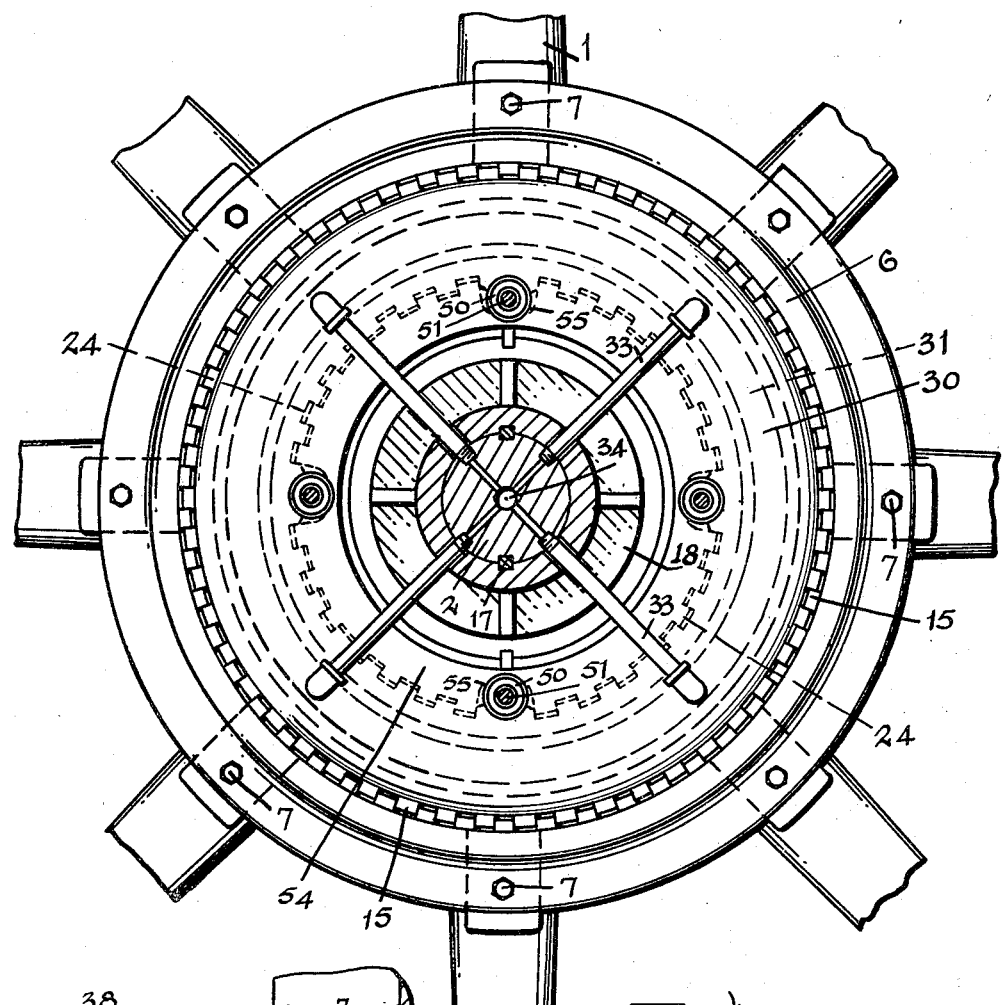
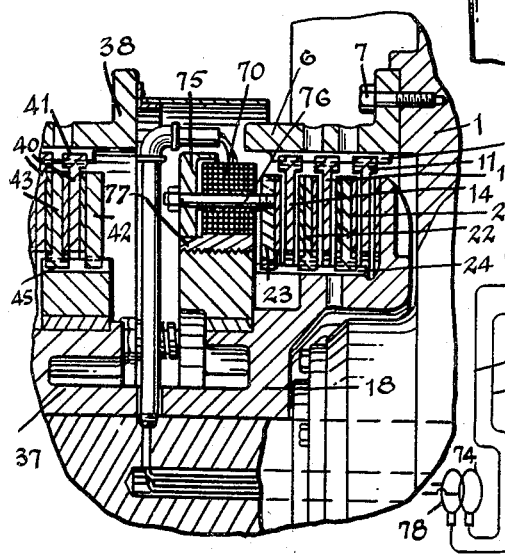
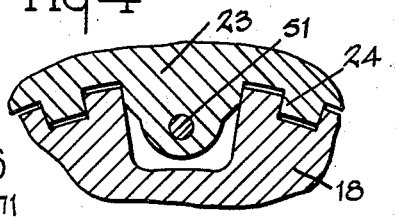

Patented July 23, 1935

2,009,301

UNITED STATES PATENT OFFICE 2,009,301

CLUTCH AND BRAKE CONTROL DEVICE

Fredrich J. Rode and Meredith R. Hatch, Toledo, Ohio

Application December 20, 1933, Serial No. 703,192

13 Claims. (Cl. 192—18)

Our invention relates to devices for the transmission of power between a driving element and a driven element and provides generally a connecting means operable according to the will of the operator for frictionally connecting and disconnecting the driving element with the driven element, and means operative coincident with the connecting means for frictionally connecting and disconnecting the driven element with an element resistant to movement of the driven element to arrest and brake the movement of said driven element.

Our invention has for an object to provide a clutch and brake control device having means normally operable to engage a driven element in a transmission device and hold the element against movement, and means operable to connect the said driven element with a driving element upon release of the driven element by the first named means, the parts thereof being compactly arranged to produce a structure conducive to economy of space and facilitate the control of the machine by an operator. Another object of our invention is to provide a clutch and brake control device for a power transmission having means for automatically establishing a braking condition relative to the driven element concurrently with the disestablishment of a clutching relation between the said driven element and a driving element, whereby the driven element may be driven to a definite desired position and is prevented from overrunning. The invention, therefore, provides a clutch and brake control device in which means is provided for producing substantially instantaneous brake and clutch operations of the character that will prevent drag of the brake parts upon application of the clutch, or "burning" of the clutch parts upon application of the brake.

One of the particular objects of our invention is to provide for a power transmission device having driving and driven elements and a clutch and brake control in which a driven part mounted on the driven element is normally biased to engage a part resistant to other than limited movement and is further disposed on controlled movement thereof to disengage said part resistant to movement and engage a driving part mounted on the driving element. Another of the particular objects of our invention is to provide a clutching device having means for actuating the clutch to establish a clutching relation with a driven element against the tendency of a biased brake normally tending to establish a braking relation with said driven element. A still further particular object is to provide a brake biased relative to a driven element and normally tending to exert a braking force thereon and means for diverting and overcoming said normal tendency concurrent with and upon the action of a clutch on said driven element.

A still further and more particular object of our invention is to provide the combination of a clutch mechanism and a biased brake mechanism operative on a driven element common to both mechanisms whereby the end thrust exerted in clutching and braking is borne and sustained by the driven part, and means for moving the clutch mechanism to operatively connect the driven element with a source of energy and means interconnecting said clutch mechanism and said biased brake mechanism whereby said brake mechanism is actuated when the driven element is not connected to said source of energy through the said clutch mechanism. The invention therefore provides a safety means for tools, machinery, and operator employed in connection with said control device in that should the clutch operating means fail to operate the clutch or, having operated the clutch, fail to maintain it in clutched relation, the brake will remain automatically set or will be automatically set, preventing movement of the driven part except through operation of the clutch.

Our invention consists in other features and advantages which will appear from the following description and upon examination of the drawings. Structures containing our invention may partake of different forms and may be varied in their details and still embody our invention. To illustrate a practical application of our invention, we have selected a clutch and brake control device embodying the invention and one of its modifications as examples of the various structures and details thereof that contain our invention, and have described the selected structures hereinafter, it being understood that variations may be made without departing from the spirit of our invention. The particular structures selected are shown in the accompanying drawings.

Figure 2:
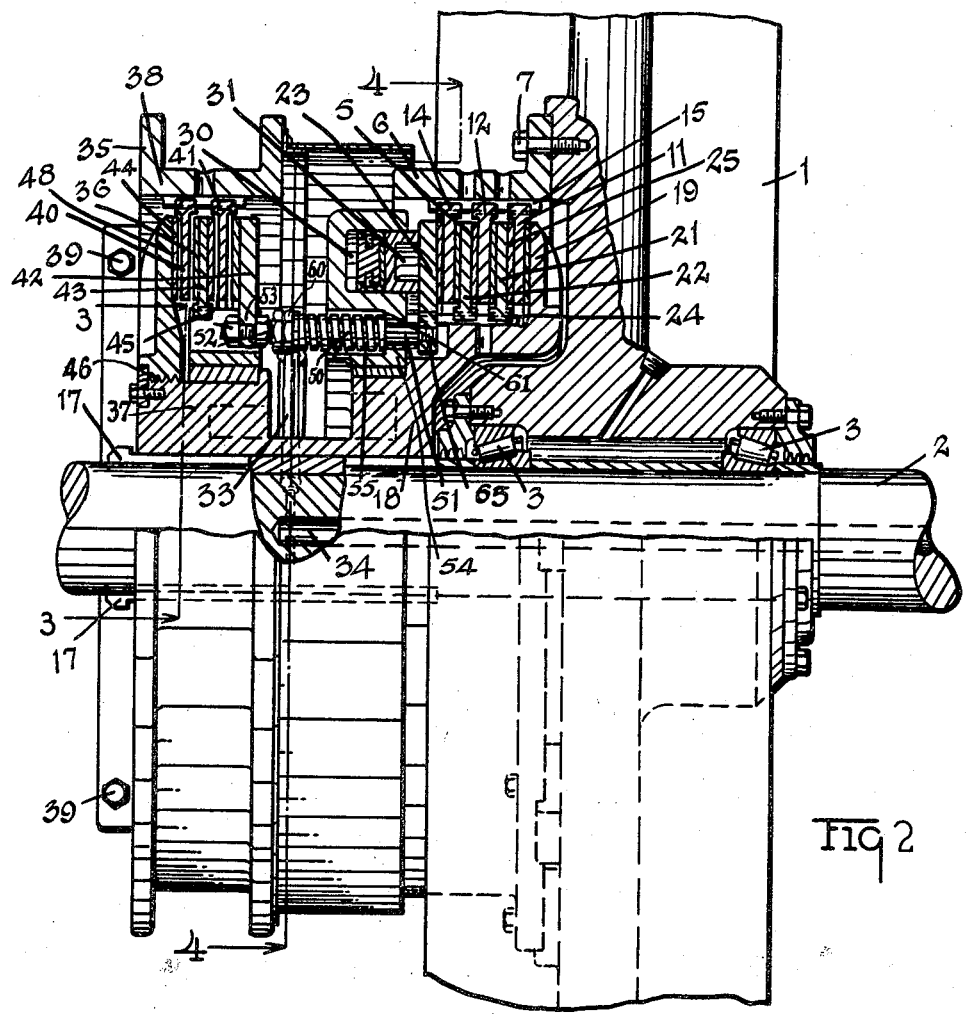
Figure 3:
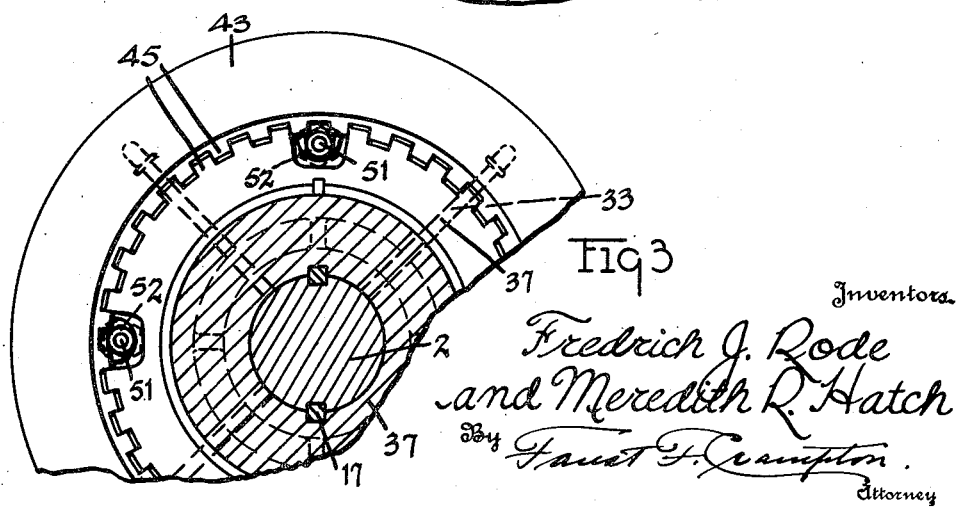

Fig. 1 of the accompanying drawings illustrates a view in perspective of a preferred form of construction embodying our invention. Fig. 2 illustrates a view of a section of the construction shown in Fig. 1. Fig. 3 illustrates a view of a section taken along the plane of the line 3—3 indicated in Fig. 2. Fig. 4 illustrates a view of a section taken along the plane of line 4—4 indicated in Fig. 2. Fig. 5 illustrates a view of an enlarged section of one of the driven parts. Fig.

6 illustrates a view of a section of a modification of the construction shown in Fig. 1 and embodying our invention.

Our invention may be embodied in a friction disc clutch for operatively connecting a driving member, such as a fly wheel, to a driven member, such as a drive shaft, and a friction disc brake for operatively connecting the said drive shaft with an element resistant to movement, as for example, to a portion of the supporting frame of the drive shaft. Means is provided for moving a clutch driving or clamping disc of the clutch to establish a clutching relation between the drive shaft and fly wheel. The clutch clamping disc is connected to a brake operating or clamping disc and the movements of the clutch disc to establish a clutching relation will cause movements of the brake operating disc in a direction opposite to that required for establishing a braking action on said drive shaft. A means yieldingly resistant to said movements of said brake operating disc operates to return the brake operating disc to a position of established braking action when the clutching disc moves to a normal position of release of the flywheel.

In the form of construction shown for purposes of illustration in the accompanying drawings, a driving element, such as a fly wheel 1, and a driven element, such as the drive shaft 2, are shown. The fly wheel 1 is supported by suitable bearings 3 on the shaft 2 and is freely rotatable thereabout. The flywheel 1 may be rotated by energy supplied from some suitable source and in fulfilling its designed purpose is kept in substantially constant rotation during the period of use of the machine to which the transmission device may be applied. The drive shaft 2 is connected in a suitable manner to parts of the machine which perform work as required and in a manner well known in the art.

In order to transmit the movement of the flywheel 1 to the drive shaft 2 and to operatively connect the fly wheel thereto as desired, a clutch 5 is provided. The clutch 5 is operably controllable by an operator of the machine so that the drive shaft 2 may be rotated according to the required performance of the parts of the machine connected to the drive shaft. The clutch 5 is enclosed within a suitable housing drum 6 which is preferably connected, as by bolts 7, to the flywheel 1 and rotates therewith. The drum 6 supports within itself a plurality of clutch driving rings, such as an inner driving ring 11, a middle driving ring 12, and an outer driving ring 14. The clutch driving rings are supported for movements along their common axis by suitable multiple spline fittings 15.

The driven element or shaft 2 carries complimentary parts of the clutch assembly in a clutch hub 18 which is keyed to the shaft 2 by keys 17. The hub 18 has a driving jaw or flange portion 19 which extends radially between the inner driving ring 11 and the flywheel 1. A plurality of driving discs, such as the inner disc 21, the middle disc 22, and the outer disc 23, are supported by suitable multiple spline fittings 24 on the hub 18. The disc 21 is located between the rings 11 and 12, and the disc 22 is located between the rings 12 and 14, and the disc 23 is located in proximity to the ring 14. Thus, it will be seen that the rings 11, 12 and 14 are located in surface engaging relation to the driving flange portion 19 and the driving discs 21, 22 and 23 respectively. If desired, the surfaces of the discs 21, 22, and 23 and the flange 19 may be provided with suitable linings 25, so as to increase the frictional grip between the discs and the driving rings when the discs are shifted along the spline fittings 24 into clamping clutch relation with the rings.

In order to move the driving discs into clamping clutch relation with the driving rings of the clutch 5, the outer or clamping disc 23 is connected to a means operable according to the will of the operator and actuable to shift the disc 23 in a direction parallel to its axis and toward the flange portion 19 to thus increasingly clamp the rings 11, 12 and 14 between the flange portion 19 and the discs 21, 22, and 23 respectively. In the preferred form of construction said means comprises an annular cylinder 30 suitably supported on the hub 18 and in which an annular ring piston member 31 is adapted to reciprocate. The piston member 31 is adapted to engage the outer face of the outer clamping disc 23 and move the disc by a fluid pressure exerted within the cylinder 30 upon the piston such as by the pressure of compressed air. The cylinder 30 receives its charge of compressed air through pipes 33 communicating with a conduit 34 formed centrally in the shaft 2 and connected with a controllable and suitable source of supply of compressed air. Thus, when air under pressure is directed into the cylinder 30, the clutching discs and rings will be clamped and frictionally engage each other, and the rotative movement of the fly wheel 1 will be transmitted to the drive shaft 2. It will be further noted that the end thrust reactantly exerted by the piston member 31 in effecting clutching will be entirely borne and sustained by and within the hub 18 and not by the shaft 2.

In order to retard the movement of the drive shaft 2, as when the clutch 5 is disengaged, a brake 36 is provided. The brake 36 is enclosed within a housing frame 38. The frame 38 may be mounted on a fixed part of the machine by the bolts 39 and preferably has a skirt portion 35 which serves to protect and guard the parts of the device. The frame 38 has a plurality of friction rings 40 supported therein by suitable multiple spline fittings 41, permitting movement of the rings in directions parallel to their common axis within the frame 38 but resistant to angular movements. The rings 40 are adapted to be clasped and frictionally engaged by and between brake discs carried on an extension 37 of the hub 18. An inner disc 42, a middle disc 43, and an outer disc 44 are provided, the inner disc 42 and middle disc 43 being mounted on extension 37 of the hub by suitable multiple spline fittings 45, permitting shifting movements of the discs, and the outer disc 44 being threaded, as at 46 to the extension 37 of the hub 18, permitting easy assembly of the brake parts. The discs 42, 43, and 44 may be provided with brake linings 48 and are adapted, on movement towards each other, to clasp the surfaces of the rings 40 therebetween. The disc 42, therefore, operates as a clamping disc together with the disc 44 which functions as a jaw element in clamping the rings 40 and disc 43 together.

The discs 42 and 43 are normally caused to move towards each other and toward the disc 44 by a plurality of compressed springs 50 acting through suitable pins 51. One end of each pin 51 is secured as by nuts 52 to an ear 53 formed on the disc 42. The other end of each pin 51 is mounted for slidable reciprocation in an opening 55 cored in a radially extending portion 54 of the hub 18.

Each spring 50 is supported by one of the pins 51 and bears against washer nuts 60 located on the shank of each pin and against a recessed shoulder portion 61 surrounding each opening 55. The nuts 60 are preferably adjustable to maintain spring compression and to provide for take-up on resultant wear of the brake disc. Thus, the disc 42 will be normally biased in a direction tending to effect clasping of the rings 40 to establish a braking relation as between the shaft 2 and the frame 38, the reactant pressure or end thrust exerted by the springs 50 being borne by the hub 18 and not by the shaft 2.

In order to release the rings 40 and disestablish said brake relation coincidently with the application of the clutch 5, the brake disc 42 is connected to the shiftable outer clutch disc 23 through the pins 51 which have threaded portions 65 adapted to be received in like threaded portions formed in the clutch disc 23. Thus, when the clutch operating cylinder 30 receives a charge of compressed air, the disc 23 will be moved to establish a clutching relation and at the same time move the brake disc 42 in a direction to release and substantially disengage the brake rings 40. Upon a reduction or withdrawal of the charge within the cylinder 30, the springs 50, which have been further compressed upon establishment of the clutch relation, tend to open the clutch and cause movement of the disc 42 in a direction of normal brake application to brake the movement of the drive shaft 2.

In the modified structure shown in Fig. 6, a modified means for operating the clutch 5 and the clutch disc 23 is shown. Said means comprises a suitable coil 70 adapted, upon energization thereof from a suitable source of electrical energy through conductor 71, switch 72, contact ring 74, coil 70, contact ring 78 and coductor 73, to produce a magnetic influence on an annular armature 75. The armature 75 is connected as by suitably insulated pins 76 to the disc 23 so that upon movement of the armature in response to the said magnetic influence of the coil 70 the disc 23 will be moved to establish the clutch relation as before. The coil 70 may be supported on a suitable collar 77 threaded on the hub 18, thereby permitting adjustment of the coil to maintain a normal gap intermediate the coil and the armature to insure operation and to take up on wearing of the clutch parts and lining. In the modified structure the disc 23 is connected to the brake operating device 42 in the same manner as was described in connection with the preferred structure.

While in accordance with the provision of the statutes we have illustrated and described one of the best forms of our invention and a modification thereof now known to ourselves, those skilled in the art will readily understand that many changes may be made in the form of the devices disclosed without departing from the spirit of our invention as set forth in the appended claims and that certain features of our invention may be used to advantage without a corresponding use of other features.

We claim:

1. In a clutch and brake control for a power transmission device having driving and driven parts and a fixed part, the said parts being coaxially arranged, friction discs mounted on each of the said parts for axial, non-rotative movements relative to the parts on which they are mounted, the friction discs mounted on the driven part divided into two sets, each of said sets located intermediate and in alternate arrangement with the friction discs mounted on one of the other parts, the driven part having a pair of flanges, a pair of clamping rings located in opposed relation to the flanges and disposed intermediate the said sets of friction discs, a plurality of rods interconnecting the clamping rings, springs mounted on the said rods for normally clamping the friction discs of the fixed part and the driven part, means for shifting the rods and the clamping rings contra the pressure of the springs to produce frictional engagement of the friction discs of the driving part and the driven part upon releasement of the friction discs of the driven part and the fixed part.

2. In a clutch and brake control for a power transmission device having driving and driven parts and a fixed part, the said parts being coaxially arranged, friction discs mounted on each of the said parts for axial, non-rotative movements relative to the parts on which they are mounted, the friction discs mounted on the driven part divided into two sets, each of said sets located intermediate and in alternate arrangement with the friction discs mounted on one of the other parts, the driven part having a pair of flanges, a pair of clamping rings located in opposed relation to the flanges and disposed intermediate the said sets of friction discs, a plurality of rods interconnecting the clamping rings, springs mounted on the said rods for normally clamping the friction discs of the fixed part and the driven part, a cylinder member, a piston operated by fluid pressure disposed in the cylinder member and operatively connected to the clamping rings for moving the clamping rings contra the pressure of the springs to produce clutch engagement between the driving part and the driven part upon the release of the friction discs mounted on the fixed part.

3. A clutch and brake control for a power transmission having driving and driven parts and a fixed part, friction members mounted on the said parts and being axially movable with respect thereto, certain of the friction members mounted on the driven part being located adjacent to a friction member mounted on the driving part, the other of the friction members mounted on the driven part being located adjacent to a friction member mounted on the fixed part, a clamping element mounted on and rotatable with the driven part and movably disposed intermediate the said certain of the friction members of the driven part and the said other of the friction members of the driven part, means tending to bias the clamping element toward the said other of the friction members of the driven part to effect frictional engagement with the friction member mounted on the fixed part, and a power operated means controllably operative within itself mounted on the driven part and rotatable therewith for moving the said clamping element against the said bias and toward the said certain of the friction members of the driven part to effect frictional engagement with the friction members mounted on the driving part.

4. A clutch and brake control for a power transmission having driving and driven parts and a fixed part, friction members mounted on each of said parts and being axially movable with respect thereto, certain of the friction members mounted on the driven part being located intermediate and in alternate arrangement with friction members mounted on the driving part, other of the friction members mounted on the driven part being located in intermediate and alternate arrangement with the friction members mounted on the fixed part, a pair of clamping elements disposed intermediate the said certain and said other friction members, one of said clamping elements movably supported adjacent to the said certain friction members, the second of said clamping elements movably supported adjacent to the said other friction members, connecting members for interconnecting both of said clamping elements, a resilient means guided by said connecting members tending to move the second named clamping element toward the said other friction members to effect a frictional engagement between the same and the friction members mounted on the fixed part, and a controllably operative means for moving the said first named clamping element toward the said certain friction members to effect a frictional engagement between the same and the friction members mounted on the driving part unclamping the said other friction members from the friction members mounted on the fixed part.

5. A clutch and brake control for a power transmission having driving and driven parts and a fixed part, the driving and fixed parts having splined portions, friction members slidably supported in said splined portions, the driven part having splined portions, friction members slidably supported in said second named splined portions of the driven part, certain of the friction members mounted on the driven part being located intermediate and in alternate arrangement with the friction members mounted on the driving part, other of the friction members mounted on the driving part being located intermediate and in alternate arrangement with the friction members mounted on the fixed part, a pair of clamping elements, one of said clamping elements slidably mounted adjacent to the said certain friction members mounted on the driven part, the second of said clamping elements slidably mounted adjacent to the said other friction members mounted on the driven part, connecting members for interconnecting the clamping elements, a resilient means disposed intermediate the clamping elements and tending to move the clamping elements toward the said certain friction members to effect a frictional engagement with the friction members mounted on the fixed part and release of the said friction discs mounted on the driving part, and a power operated means controllably operative within itself mounted on the driven part and rotatable therewith for moving the clamping elements toward the said other friction members to effect frictional engagement with the friction members mounted on the driving part and release of the said frictional discs mounted on the fixed part.

6. A clutch and brake control for a power transmission having driving and driven parts and a fixed part, the driving and fixed parts having splined portions, friction members slidably supported in said splined portions, the driven part having splined portions, friction members mounted on the driven part and slidably supported in said splined portions of the driven part, certain of the friction members mounted on the driven part being located intermediate and in alternate arrangement with the friction members mounted on the driving part, other of the friction members mounted on the driven part being located intermediate and in alternate arrangement with the friction members mounted on the fixed part, a pair of clamping elements, one of said clamping elements slidably mounted adjacent to the said certain friction members of the driven part and in the splined portion thereof, the second of said clamping elements slidably mounted in a splined portion of the driven part and disposed adjacent to the said other friction members mounted on the driven part, connecting members for interconnecting the clamping elements, a resilient means tending to move the clamping elements along the splined portion toward the said certain friction members to effect a frictional engagement with the friction members mounted on the fixed part, and a controllable fluid operative means mounted on the driven part and rotatable therewith for moving the clamping elements along the splined portions toward the said other certain friction members to effect frictional engagement with the friction members mounted on the driving part in counteraction to the resilient means.

7. In a clutch and brake control for a power transmission device having driving and driven parts and a fixed part, the said parts being coaxially arranged, friction discs mounted on each of the said parts for axial, non-rotative movements relative to the parts on which they are mounted, the friction discs mounted on the driven part divided into two sets, each of said sets located intermediate and in alternate arrangement with the friction discs mounted on one of the other parts, the driven part having a pair of flanges, a pair of clamping rings located in opposed relation to the flanges and disposed intermediate the said sets of friction discs, a plurality of rods interconnecting the clamping rings, springs mounted on the said rods for normally clamping the friction discs of the fixed part and the driven part, an annular cylinder coaxially arranged with respect to and located between the clamping rings, an annular piston operatively connected to one of the clamping rings and movable by fluid pressure within the cylinder to shift the clamping rings and produce frictional engagement of certain of the said friction discs and releasement of other of the said friction discs to alternately brake and clutch the driven part.

8. In a clutch and brake control for a power transmission device having driving and driven parts and a fixed part, the said parts being coaxially arranged, friction discs mounted on each of the said parts for axial, non-rotative movements relative to the parts on which they are mounted, the friction discs mounted on the driven part divided into two sets, each of said sets located intermediate and in alternate arrangement with the friction discs mounted on one of the other parts, the driven part having a pair of flanges, a pair of clamping rings located in opposed relation to the flanges and disposed intermediate the said sets of friction discs, a plurality of rods interconnecting the clamping rings, springs mounted on the said rods for normally clamping the friction discs of the fixed part and the driven part, an annular cylinder coaxially arranged with respect to and located between the clamping rings, an annular piston operatively connected to one of the clamping rings and movable by fluid pressure within the cylinder to shift the clamping rings between the friction discs to move the same and produce frictional engagement of certain of the said friction discs and releasement of other of the said friction discs to alternately brake or clutch the driven part, a passageway extending axially through the driven part and radially to the annular cylinder, a source of supply of fluid pressure connected to the said passageway, and means for controlling the pressure of the fluid directed through the passageway to the cylinder.

9. A clutch and brake control for a power transmission having driving, driven, and fixed parts, friction members mounted on the said parts and being axially movable with respect thereto, the friction members mounted on the driven part being divided into two sets, one set located adjacent to and in alternate relation with friction members mounted on the driving part and the other set mounted on the driven part being located adjacent to and in alternate relation with friction members mounted on the fixed part, a clamping element mounted on and rotatable with the driven part and located intermediate the said sets, means tending to bias the clamping element toward one set to effect frictional engagement with the friction members located in alternate relation therewith, a power element mounted on the driven part and rotatable therewith, and a member rotatable with the driven part cooperable with the said power element for engaging the said clamping element for moving the same against the said bias to clamp the said other set and the alternately arranged friction members to effect frictional engagement therewith.

10. A clutch and brake control for a power transmission having driving, driven, and fixed parts, friction members mounted on each of said parts and axially movable with respect thereto, certain of the friction members mounted on the driven part and located adjacent to a friction member mounted on the driving part, the other of the friction members mounted on the driven part and located adjacent to a friction member mounted on the fixed part, a clamping element axially movable with respect to and rotatable with the driven part, means tending to bias the clamping element towards the said other friction members of the driven part to effect a frictional engagement with the friction member mounted on the fixed part, a power element mounted on the driven part and rotatable therewith, and a member rotatable with the driven part cooperable with the power element for engaging the clamping element for moving the clamping element against the said bias to move the said certain of the friction members of the driven part to effect frictional engagement with the friction members mounted on the driving part.

11. A clutch and brake control for a power transmission having driving, driven, and fixed parts, friction members mounted on each of the said parts and axially movable with respect thereto, certain of the friction members mounted on the driven part and located adjacent to a friction member mounted on the driving part and other of the friction members mounted on the driven part and located adjacent to a friction member mounted on the fixed part, and a clamping means supported on and rotatable with the driven part for selectively clamping the friction members on the driven part with either the friction members on the driving or fixed parts and actuatable to produce clamping pressures in opposite directions within the said clamping means whereby end thrust as between the clamping element and the driven part during clamping opeations will be eliminated.

12. A clutch and brake control for a power transmission having driving, driven, and fixed parts, friction members mounted on the said parts and axially movable with respect thereto, certain of the friction members mounted on the driven part and located adjacent to a friction member mounted on the driving part and other of the friction members mounted on the driven part and located adjacent to a friction member mounted on the fixed part, a clamping means supported on the driven part for selectively clamping the friction members of the driven part with either the friction members of the driving or fixed part, and an actuating means mounted on and rotatable with the driven part for producing pressures in the clamping means in opposite directions during said clamping and eliminating end thrust forces as between the actuating means and the driven part.

13. A clutch and brake control for a power transmission having driving and fixed parts, friction members mounted on each of said parts and axially movable with respect thereto, a driven shaft, a driven part mounted on the driven shaft and rotatable therewith, a plurality of friction members mounted on the driven part, the driven part having a pair of spaced jaw elements, certain of the friction members on the driven part disposed proximate to one of the said jaw elements and adjacent to the friction members on the fixed part and other of the friction members on the driven part disposed proximate to the other of the jaw elements and adjacent to the friction members on the driving part, a clamping element movably disposed in opposed relation to the jaw elements, a means mounted on the driven part tending to move the clamping element toward one of the jaw elements and to clamp therebetween the said certain of the friction members on the driven part with the friction members on the fixed part, a clamping element actuating means mounted on the driven part for moving the clamping element against the tendency of the first named means and toward the said other of the jaw elements to clamp therebetween the said certain of the friction members on the driven part and the friction members on the driving part, each of said means connected to the driven part to produce reactant pressures on a portion of the driven part while actuating said clamping element whereby the end thrusts are sustained by the driven part upon clamping the friction elements of the fixed part or clamping the elements of the driving part.

FREDRICH J. RODE.
MEREDITH R. HATCH.

DISCLAIMER 2,009,301.—*Fredrich J. Rode* and *Meredith R. Hatch*, Toledo, Ohio. CLUTCH AND BRAKE CONTROL DEVICE. Patent dated July 23, 1935. Disclaimer filed August 11, 1939, by the inventors and the licensees, *E. W. Bliss Company* and *Toledo Machine & Tool Company*.

Hereby enter this disclaimer to and of each and every claim in the said patent.
[*Official Gazette August 29, 1939.*]